July 29, 1924.

R. L. SKINNER

1,502,921

INTERNAL COMBUSTION ENGINE OIL AND FUEL APPLIANCE

Filed May 26, 1921 4 Sheets-Sheet 1

July 29, 1924.
R. L. SKINNER
1,502,921
INTERNAL COMBUSTION ENGINE OIL AND FUEL APPLIANCE
Filed May 26, 1921
4 Sheets-Sheet 2

July 29, 1924.  
R. L. SKINNER  
1,502,921  
INTERNAL COMBUSTION ENGINE OIL AND FUEL APPLIANCE  
Filed May 26, 1921    4 Sheets-Sheet 3

Patented July 29, 1924.

1,502,921

UNITED STATES PATENT OFFICE.

RALPH L. SKINNER, OF SACRAMENTO, CALIFORNIA, ASSIGNOR TO SKINNER AUTOMOTIVE DEVICE CO., INC., OF SACRAMENTO, CALIFORNIA, A CORPORATION OF CALIFORNIA.

INTERNAL-COMBUSTION-ENGINE OIL AND FUEL APPLIANCE.

Application filed May 26, 1921. Serial No. 472,746.

*To all whom it may concern:*

Be it known that I, RALPH L. SKINNER, a citizen of the United States, residing at Sacramento, in the county of Sacramento and State of California, have invented certain new and useful Improvements in Internal-Combustion-Engine Oil and Fuel Appliances, of which the following is a specification.

Present day internal-combustion motors are subject to serious defects, lack of economy in operation, and unnecessary wear which it is the object of this invention to remedy.

In the first place, the lubricating oil splashed or otherwise fed on to the inner walls of the engine cylinders for friction reducing purposes by the moving crank-shaft and connecting rods and possible accessories, finds its way in substantial quantities past the reciprocating pistons into the fuel combustion chambers above them, due to several causes, including the excess of oil on the cylinder walls, the movements of the pistons, and the sub-atmospheric pressure in such chambers during the intake strokes of their pistons. The oil thus present in the chambers becomes converted into objectionable carbon on the piston heads, the walls of the chambers, and the spark-plugs bringing about the well known undesirable effects on the smooth and efficient operation of the motor. In addition, the contact of such oil with the spark-plugs, especially likely to occur if the pistons are somewhat loose fitting in their cylinders, brings about their short-circuiting hence rendering them useless until cleaned or replaced. Such excess of oil as enters the firing chambers represents in addition a substantial oil loss or needless consumption because it performs no useful function, its presence therein constituting a menace to the proper action of the motor.

In the second place, more or less unconsumed liquid or gaseous fuel and products of combustion escape downwardly past the pistons into the crank-case where they seriously dilute and contaminate the supply of lubricating oil therein. This is particularly true in winter when the fuel is not so readily vaporized and when it is more difficult to start the engine and is also especially true if the pistons fit the cylinders somewhat loosely, but such objectionable polluting of the oil, thereby materially reducing its lubricating qualities, occurs to a serious extent even in motors in the best of running order, due particularly to the low grade of liquid fuel now on the market and in common use.

The prime aim and salient purpose of this invention is the provision of a simple, effective, economical, and inexpensive means to prevent the upward passage of the excess oil by the pistons into the explosion chambers and to preclude the downward flow of the fuel and combustion gases past the pistons into the crank-case.

It has heretofore been proposed to substantially continuously withdraw the contaminated or diluted lubricant from the crank-case of an internal-combustion engine a little at a time and by evaporative or gasifying processes refine such small portion of the oil and return it to the lubricating system, but such method or apparatus is not entirely satisfactory because it permits the contamination of the lubricant and attempts thereafter to remove its objectionable qualities. This means that the whole body of lubricant must be treated to get rid of its contaminating ingredients, and, inasmuch as the dilution is occurring practically continuously when the motor is in operation, the whole lubricant supply is always in a more or less inferior condition resulting in improper or inadequate lubrication and the occurrence of the other objectionable characteristics of diluted lubricant such as its more or less ready access in excessive quantity into the firing chambers above the pistons. One object of the present invention is, not to permit such pollution with a subsequent attempt to remove the objectionable diluents, but rather, to prevent the occurrence of the original contamination of the oil or lubricant supply whereby the main body of lubricant is always in prime condition or retains substantially its original lubricating qualities.

Another valuable feature of this invention resides in its prevention of the formation of moisture in the crank-case of the motor due to condensation of the gaseous products of combustion escaping downwardly past the pistons, such moisture when combined with the sulphur constitutents of most of the present day fuels producing an acid having distinct corrosive and etching effects on the metal parts, such as the wrist-pins, valve-lifter guides, chain-link connections, bearings, etc. In addition, if this moisture is permitted to be present in the crank-case, in winter it is likely to freeze resulting in a stoppage of the lubricating system bringing about burned-out bearings, scored cylinders and other serious occurrences.

Furthermore, unless the lubricating oil is maintained in proper condition and prevented from becoming diluted, the road dust entering the cylinders through the carbureter and crank-case breather-tube has an abrasive and wearing effect on the moving metal parts with which it comes into contact, but if the lubricating qualities of the oil are kept in proper condition, the wearing effects of such dirt and dust are substantially reduced, and this result is accomplished by the employment of devices incorporating this invention.

A further object of the invention is the separate recovery of the excess oil and fuel returning the former to the engine crank-case for further use and the introduction of the latter into the intake manifold of the engine for consumption in the combustion chambers thus effecting a radical saving in both elements.

Another goal of the invention is the production of an appliance of this character which will efficiently perform the functions specified and which may be installed in new motors at the time of manufacture or which may be readily incorporated in motors already in service.

An added feature of the invention is the provision of means which will permit the use of a thinner or lighter grade of lubricating oil for the pistons of the motor than has heretofore been usual with its advantages of reduced friction losses but without incurring the usual disadvantages ordinarily incident to the employment of such kind or grade of oil.

In order that those skilled in this art may have a full and complete understanding of this invention both from structural and functional standpoints and may know how the above-stated and other objects of the invention are accomplished, I have illustrated in the accompanying drawings forming a part of this specification two desirable embodiments of the invention, like reference characters referring to the same parts throughout the several views.

Figure 2:
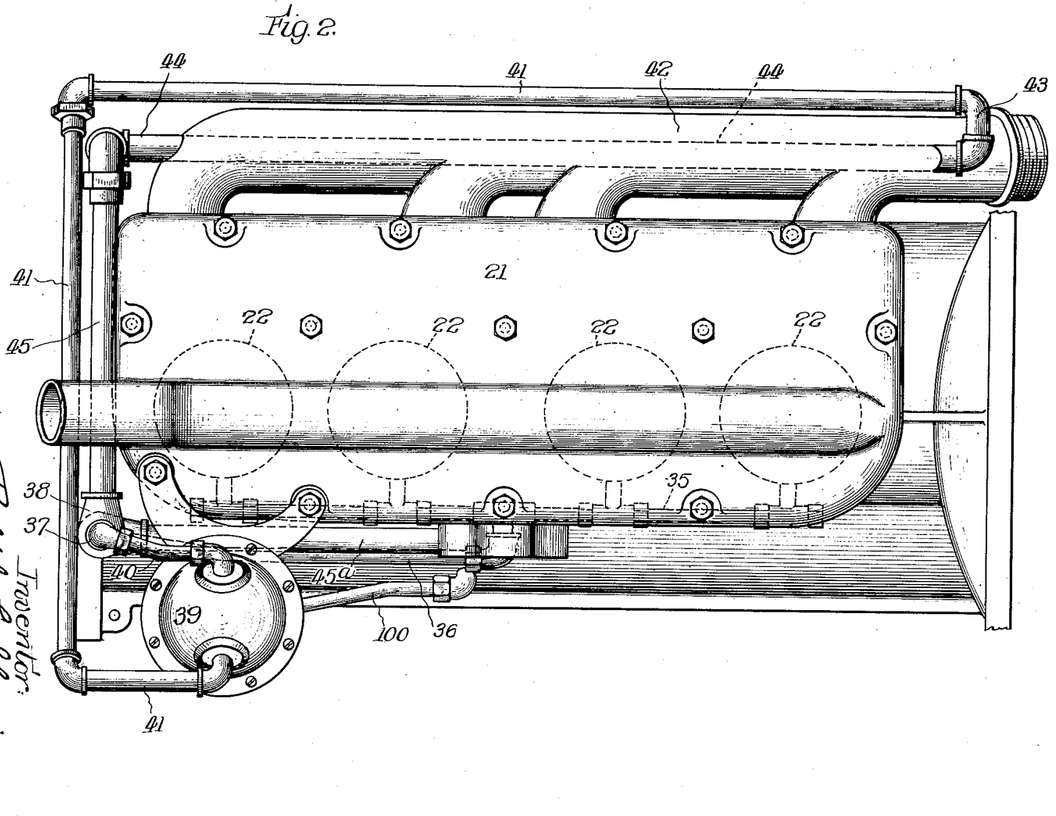
Figure 2 is a plan view of the same construction.
Figure 3:
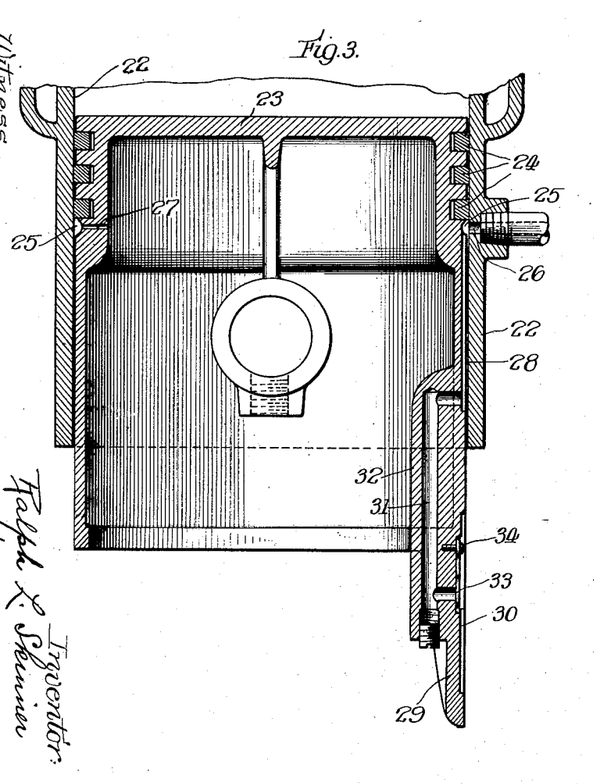
Figure 3 is a fragmentary section through one of the engine cylinders and its piston.

Referring to these drawings, it will be observed that the multi-cylinder internal combustion engine or motor of usual form, which may have any appropriate or well known splash or force feed or other lubricating system for its cylinders and pistons, has been supplied as a whole with the reference numeral 21, each of its four cylinders, water-jacketed or air-cooled as may be preferred, as shown in Figures 2 and 3, being designated 22.

Figure 4:
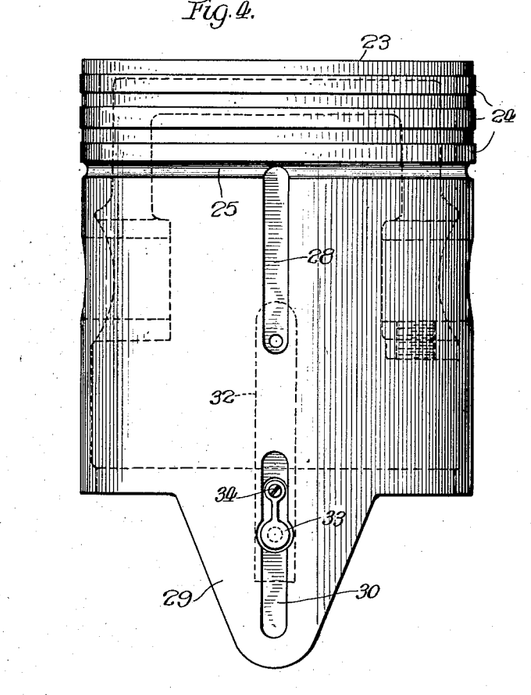
Figure 4 is a side elevation of the piston.

Each hollow, reciprocatory piston 23 at its upper portion, as is customary, has a plurality of piston-rings 24, 24, three being used in the present instance, and just below these the piston is provided with a shallow, annular groove or channel 25 extended entirely around the piston and adapted to be in substantial register, when the piston is at its lowermost point in its stroke, with a port or aperture 26 through the cylinder wall and through which in a manner hereinafter explained suction or sub-atmospheric pressure is effected in the groove.

Diametrically opposite port 26, the piston has a small relief or bleeder port or aperture 27 extended through its wall and therefore in communication with the interior of the hollow piston and with the crank-case atmosphere.

As is usual in this art, the external diameter of the lower portion of the depending skirt of the piston is slightly greater than that of the upper portion of the piston, the latter being subject to greater ranges of temperature and to greater degrees of expansion and contraction than the lower part of the skirt.

It is, therefore, somewhat more essential to effectively lubricate such skirt than the upper portion of the piston, and, heretofore, to prevent excess lubrication, its lower portion has in many cases been fittted with a piston-ring to wipe off the surplus oil from the cylinder wall.

In the present device, owing to the removal of the excess oil in another way, such lower ring may be omitted and hence there is decreased wear on the cylinder wall.

It is desirable to subject the oil collecting groove 25 to the suction or exhausting action through port 26 for an extended period for the effective and efficient removal of its contents, and this period would be small if no other means were provided for prolonging it.

Accordingly, in register with such suction port 26, the piston is externally longitudinally grooved at 28, the upper end of such channel opening into the round groove 25.

The piston on its longitudinally grooved side, although this is not necessary on some pistons, has an extension 29 having an external groove 30 in alignment with the companion groove 28, the former extending upwardly slightly on to the extreme lower portion or face of the piston skirt.

As is clearly shown in Figure 3, the middle section of the lower groove or channel 30 is connected through a passage 31 in an internal rib 32 on the piston skirt and its extension with the lower end of the upper groove 28, and groove 30 is fitted with a suitably-shaped leaf spring or flap valve 33 adapted to control the opening and closing of the connection between such groove and the passage 31. Such valve is held in place by a screw 34 through one end thereof which fastens it to the base of the groove.

This piston skirt extension valve is required by reason of the fact that the piston in its lowermost position, as is indicated in Figure 3, projects below the bottom end of the cylinder wall.

During the ascent of the piston, so long as any part of channel 28 is opposite port 26 suction will be exerted on the oil and other fluid collecting groove 25, and because of such suction action valve 33 is maintained closed, although its spring force might be sufficient for the performance of this function.

When the part of the piston between the lower end of channel 28 and the top end of channel 30, during the rise of the piston, temporarily closes port 26, the suction or exhausting action on the groove encircling the piston is for the time being omitted.

During the registration of channel 30 with the suction-port 26, the exhausting action is restored, valve 33 opening outwardly under the suction influence so that the oil and other fluids in groove 25 are drawn out through channel 28, passage 31, groove 30, and port 26.

Thus an effective oil and other fluid removing suction action is exerted on the annular groove during the greater portion of the time, even though the piston is rapidly reciprocating.

The relief port 27 or its equivalent is highly desirable. If it or its equivalent is not employed, the suction will not remove the oil and other fluids to the most effective or satisfactory degree.

Such bleeder or air-inlet port assures atmospheric pressure at that point and hence establishes a substantial difference in air pressure at opposite points in the groove, this bringing about a rapid and energetic discharge flow of the oil and other fluids around both sides of the piston in groove 25 and out through the cylinder port 26.

It is to be observed that by the means described a suction ring or zone around the rapidly traveling piston is established and maintained just below its piston-rings.

Accordingly any fuel in liquid, vapor, or gaseous form and any heated products of combustion escaping down past the piston-rings come under the influence of this suction or exhausting action and they are conveyed away with the collected oil through the port 26, all as will be readily understood.

By this comparatively simple means an excess of lubricating oil is prevented from entering the combustion chamber above the piston and dilution or contamination of the crank-case oil is eliminated at the same time by removing the elements which tend to pollute the oil before they reach the crank-case.

Figure 1:
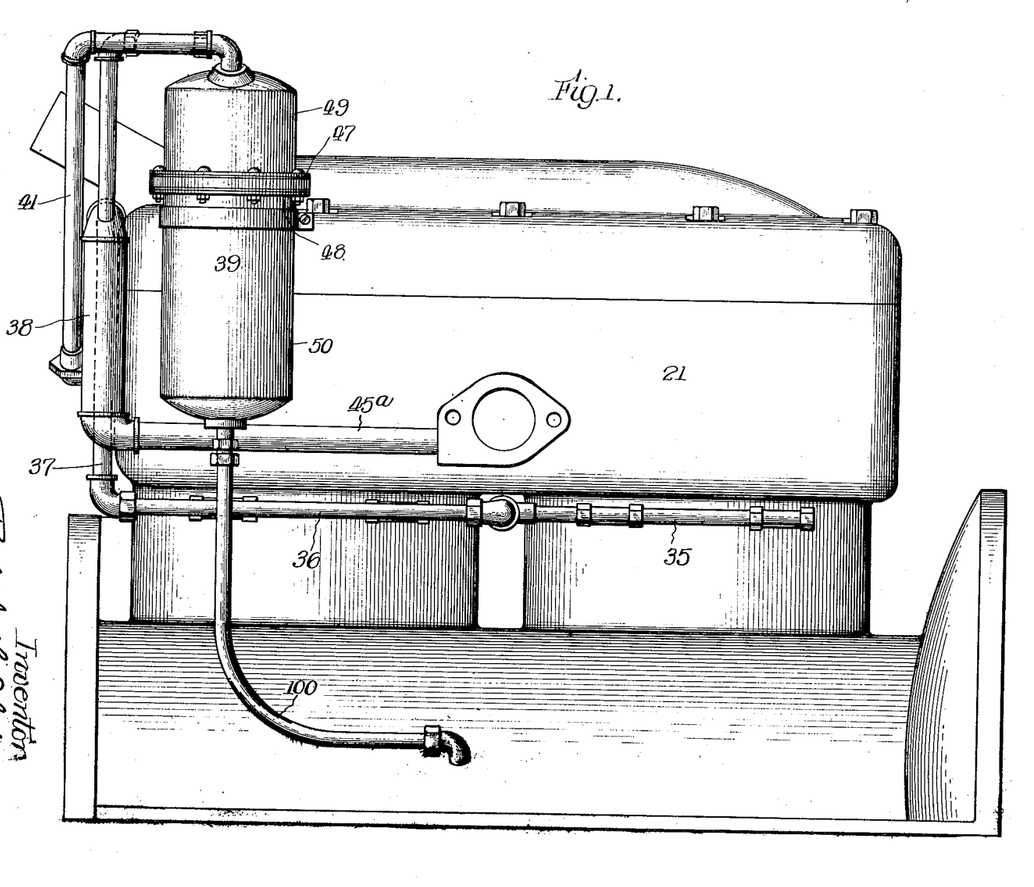
Figure 1 is a side elevation of an internal-combustion engine equipped with the new appliance.

The exhaust or suction ports 26 of the several motor cylinders are by suitable means connected to a pipe or manifold 35 common to all of them, and the middle portion of this is connected to a pipe 36 communicating with an upright pipe 37 passing through a heater or heat exchanger or gasifier 38, the upper end of pipe 37 being connected to the top of an oil trap or separator 39 by a pipe 40, the bottom of element 39 having a pipe connection 100 with the crank-case for the return thereto of the oil drawn off from around the pistons and after it has been purified.

The gases, freed from oil, leave the trap or separator through a bent pipe connection 41 which at the rear end of the motor exhaust-manifold 42 communicates at 43 with a heater pipe 44 extending lengthwise through the interior of the manifold, whereby its gaseous contents are adequately heated by the hot exhaust gases of the motor flowing through the manifold around such interposed pipe.

The front end of heater-pipe 44 is connected by another pipe 45 to the heat-exchanger gasifier 38, whereby such heated gases as flow through the pipe 45 may impart at least a portion of their heat to the mixture of oil and gases passing upwardly through pipe 37, thus assuring adequate, but not excessive, heating of the contents of such pipe to insure proper volatilization of the gasifiable constituents preliminary to their passage into the oil-separator.

From heater or gasifier 38 the hot gases flow through a pipe connection 45$^a$ into the intake manifold of the motor to be employed as a part of and as a previously heated ingredient of the explosive mixture in the running of the motor.

Figures 5, 6, 7:
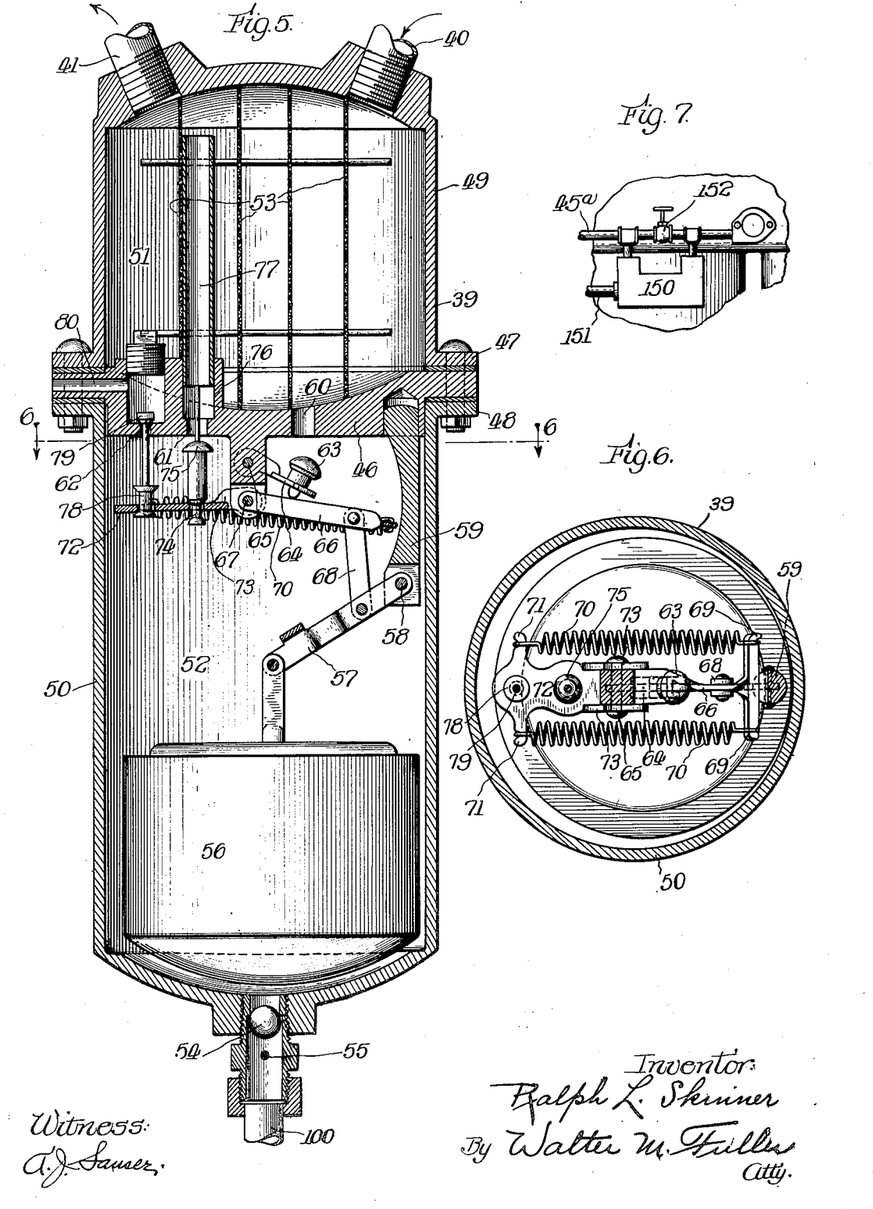
Figure 5 is a vertical central section through the oil trap or separator.
Figure 6 is a horizontal section on line 6—6 of Figure 5.
Figure 7 is a fragmentary elevation of a modification in the structure, indicating the use of a pump to create the desired suction action.

Referring now to the structural details of the oil-separator, it will be observed from Figures 5 and 6 that the tank 39 is divided horizontally near its middle by a partition 46, secured around its margin between flanges 47 and 48 of the two parts 49 and 50 of the metallic shell, into an upper separating chamber 51 and a lower storage compartment 52.

Inlet pipe 40 communicates with the top of chamber 51 at one side of a plurality of upright, spaced, fine-mesh, suitably-supported screens 53, the outlet pipe 41 connecting with the chamber on the opposite side of such screens, the latter serving to assist in collecting the oil and separating it from the gases as the latter laden with such oil flow through the screens by reason of the suction on the piping system due to its connection with the intake manifold of the engine.

The lower tank section 50 at its bottom is connected to the discharge pipe 100 through a ball check-valve 54 closing the connection when lifted by suction and opening the connection when permitted to drop by gravity and rest on its sustaining rod 55.

The lower compartment contains a hollow, metal float 56 pivotally mounted on the end of an arm 57 fulcrumed at 58 on the lower end of a post 59 secured to and depending from the partition member 46, the latter having three valve ports 60, 61, and 62 therethrough.

Valve-port 60, located between the first and second screens 53, is provided for the purpose of permitting the oil in the upper separating chamber 51 to drain down into the lower storage compartment 52 and is adapted to be opened and closed by a valve 63 on an arm 64 hinged at 65 on a lug depending from the central part of element 46, the valve normally falling open by the action of gravity as shown in Figure 5.

Such valve arm 64 in the open position of valve 63 rests on an arm 66 fulcrumed on a suitable pin at 67 in the bifurcated lower portion of the same lug and is connected near its opposite end by a link 68 to the float-controlled arm 57, arm 66 at its end also having oppositely extended parts 69 (Figure 6) connected by a pair of coil-springs 70, 70 to similar side projections 71, 71 of another arm 72 fulcrumed to the same lug coaxially with arm 66 by means of spaced ears 73 straddling such lug, arm 72 being located on the opposite side of the lug from arm 66, all as is clearly illustrated.

Arm 72 has a loose connection 74 with the stem of a valve 75 below and adapted to control the air-relief valve-port 61, the partition-wall above the latter having a socket 76 receiving the lower end of an upright pipe or tube 77 extending vertically between the third and fourth screens nearly to the top of the upper chamber.

Arm 72 also has a loose connection 78 with the stem of a valve 79 above and adapted to open and close an air-admission valve-port 62 which connects with a passage 80 leading out sidewise through the partition wall to the outer air.

In operation the upper-separating chamber 51 and the lower-storage compartment 52 are both subjected to suction through pipe 41 connected indirectly to the intake manifold of the motor or engine and this same suction is, of course, exerted on the external annular fluid collecting grooves of the several pistons in their respective cylinders delivering the mixture of gases and oil into the upper separating chamber 51 through pipe 40.

Normally, oil-port 60 and air-port 61 are open and the air-admission port 62 closed, whereby the sub-atmospheric pressure in chamber 51 is also present in compartment 52, thus maintaining the oil-delivery ball-valve 54 raised against its seat and preventing the discharge of oil from the trap.

The oil-charged gases in passing through the screens are to some extent freed from their oil content, such oil becoming caught on the screens and flowing down them into the compartment beneath through port 60, the remainder of the oil in the gases being precipitated out in their passage through the chamber from pipe 40 to pipe 41 and likewise passing down through port 60.

The preliminary heating of such gaseous and liquid mixture in the heater 38 combined with the sub-atmospheric pressure in chamber 51 makes certain that all fuel and possibly other volatilizable ingredients of the mixture will be in gaseous or vapor form when traversing the chamber and thus readily separated from the oil.

The withdrawn or removed oil gradually accumulates in compartment 52 and the float rises accordingly.

When such lower collecting compartment has thus received a substantial quantity of such oil, the float reaches a position where it occasions a passing of the coil contractile springs 70 by the fulcrum axis of arms 66 and 72 bringing about their simultaneous rapid upward oscillation, the closing of both ports 60 and 61 by their respective valves 63 and 75, and the opening of port 62 by the upward movement of its controlling valve 79.

Thus all operative connection between the upper separating chamber 51 and the lower storage compartment 52 is temporarily suspended and the previous partial vacuum condition in the latter is now replaced by atmospheric pressure due to the opening of the air-admission port 62 communicating with the outer air through passage 80.

There being no longer any partial vacuum or sub-atmospheric pressure in the lower compartment to keep the check-valve 54 closed, it drops, opens its port, and permits the refined or reclaimed oil accumulated above it in the compartment to flow down into the engine crank-case through pipe 100 ready for further use as a lubricant in the motor.

As the oil is thus delivered, the float gradually descends, and when it nears the bottom of the tank, it causes the springs 70, 70 to pass downwardly by the fulcrum axis of the companion arms 66 and 72 causing them during the sudden contraction of the springs to rock down simultaneously into the positions shown in Figure 5, immediately positively and mechanically opening port 61 and closing port 62.

Shortly afterwards the suction exerted on compartment 52 through the now open port 61 reestablishes the subatmospheric condition in such compartment, thereby causing the ascent and closing of the oil delivery valve 54, and at about the same time valve 63 opens the oil port 60 because of more or less balanced pneumatic pressures on its two sides and due also to the weight of the temporarily accumulated oil in the upper separating chamber.

While compartment 52 was discharging its contents and valve-ports 60 and 61 were closed, the separation of oil was continuing uninterruptedly in the upper chamber 51 and being temporarily stored therein, and as soon as the delivery has been completed and valve-ports 60 and 61 opened as indicated above, such oil flows down into the lower compartment, and in order that the air in the latter may be drawn off by the suction in the upper chamber and not flow or bubble up through the oil in such chamber, and, to facilitate the descent of such oil, the air flows up through port 61 and pipe 77 from the open top end of which it passes on through pipe 41 without disturbing the oil.

If such air were allowed to bubble up through the oil in the upper chamber, a part of such oil would probably be entrained in and be carried along by the air and lost.

In this manner, the collected oil is delivered intermittently to the motor sump, but without interrupting or interfering with the suction action on the several pistons and without disturbing or hindering the continuous separation of oil from the material drawn off from around such pistons.

By thus establishing and maintaining a belt or band around each piston of a pneumatic pressure different from that of the crank-case and explosion-chamber, the passage of oil and fuel and the products of combustion by the piston in opposite directions is intercepted at a point between the ends of the piston, and the combined gaseous and oil mixture is drawn off, the mixture heated to assure that none of the fuel or other gasifiable elements will be in liquid form, the oil separated out and returned intermittently to the crank-case for further use, the gaseous mixture heated by the exhaust of the engine, and such heated mixture used to heat the mixture containing the oil previous to the removal of the latter therefrom, and then passing into the engine intake manifold as heated fuel to serve as part of the fuel used in running the engine.

Thus the formation of carbon in the explosion or firing chambers of the engine from the lubricating oil is prevented, and the dilution and pollution of the crank-case oil is avoided, a saving in oil and fuel being effected at the same time.

In addition, the separated or collected oil, free from deleterious, volatile or diluent ingredients, is returned at intervals to the engine sump without destroying or modifying the fluid removing suction on the pistons.

The small air-admission or bleeder ports 27 through the piston walls provide for the entrance of air and vapors to the external, circumferential, fluid-collecting, piston grooves 25 from the crank-case, thereby relieving the suction and aerating the withdrawn fluids including the oil. Such aeration of the latter facilitates the gasification or vaporization of its volatile constituents, including the moisture, in the separating chamber whose contents are subjected to subatmospheric pressure while still heated.

By means of this structure, the skirt portion of the piston of larger diameter than the piston head and hence naturally requiring the greater lubrication, is treated to a liberal supply of oil for friction reducing purposes, and this is accomplished without danger of any substantial quantity of the oil reaching the firing chamber and forming carbon.

The oil employed may also be lighter or thinner than is ordinarily used, because under present engine conditions, without employing this invention, the heavier oil is used in an attempt to compensate for the dilution and to prevent too much from passing by the pistons.

Engineers are endeavoring to preclude or avoid the passage of the several fluids mentioned past the pistons by employing stiffer and stronger piston rings, but their use is objectionable because of the excessive wear which they necessarily produce on the cylinder walls.

In some cases, it is desirable to employ a suction pump or fan to bring about the required results and not depend solely on the suction created in the intake-manifold.

In such instances, the pump or fan 150, shown diagrammatically in Figure 7, may be inserted in the system in pipe 45ª, its shaft 151 being rotated from the motor or engine in any approved fashion, not shown, and a valve 152 is employed in the piping between the two connections of the pump therewith.

When the pump or fan is used, the valve is closed so that the suction or exhausting influence of the pump or fan is exerted throughout the entire system, the suction of the intake-manifold drawing in the gases delivered by such element.

When the pump or fan is not used, valve 152 is opened so that the action of the suction in the manifold may be exerted directly on the piping system without passing through the pump or fan.

Those skilled in this art will readily understand that this invention is not limited and restricted to the precise and exact features of structure shown and described but that these may be modified within comparatively wide limits without departure from the substance and essence of the invention and without the sacrifice of any of its substantial benefits and advantages.

I claim:

1. In a structure of the character described, the combination of a cylinder of an internal-combustion engine, a reciprocatory piston in said cylinder having a tranverse, fluid-collecting channel, means to admit air to said channel, means to lubricate said cylinder and piston, and means to apply suction to said channel to withdraw its contents.

2. In a structure of the character described, the combination of a cylinder of an internal-combustion engine, a reciprocatory piston in said cylinder having a transverse, fluid-collecting channel equipped with an air-admission relief-port, means to lubricate said cylinder and piston, and means to apply suction to said channel to withdraw its contents.

3. In a structure of the character described, the combination of a cylinder of an internal-combustion engine, a reciprocatory piston in said cylinder having a transverse, fluid-collecting channel equipped with an air-admission relief-port, means to lubricate said cylinder and piston, and means to apply suction to said channel throughout a substantial portion of the piston stroke to withdraw its contents.

4. In a structure of the character described, the combination of a cylinder of an internal-combustion engine, a hollow, open-ended, reciprocatory piston in said cylinder having a transverse, fluid-collecting channel equipped with an air-admission relief port extended inwardly through the piston wall to its hollow interior, means to lubricate said cylinder and piston, and means to apply suction to said channel throughout a substantial portion of the piston stroke to withdraw its contents.

5. In a structure of the character described, the combination of a cylinder of an internal-combustion engine, a reciprocatory piston in said cylinder having a transverse, fluid-collecting channel, means to lubricate said cylinder and piston, and means to subject said channel at spaced points to different pneumatic pressures to effect the removal of its contents.

6. In a structure of the character described, the combination of a cylinder of an internal-combustion engine, a reciprocatory piston in said cylinder having a transverse, fluid-collecting channel, means to lubricate said cylinder and piston, and means operative during a substantial portion of the stroke of the piston to subject such channel at spaced points to different pneumatic pressures to effect the removal of its contents.

7. In a structure of the character described, the combination of a cylinder of an internal-combustion engine, a reciprocatory piston in said cylinder having a transverse, fluid-collecting channel and an external longitudinal groove communicating with said channel, said cylinder having a port in register with said groove, means to admit air to said channel, means to lubricate said cylinder and piston, and means to apply suction to said port.

8. In a structure of the character described, the combination of a cylinder of an internal-combustion engine, a reciprocatory piston in said cylinder having an external, transverse, fluid-collecting channel, said cylinder having a port cooperating with said channel, means to admit air to said channel, means to lubricate said cylinder and piston, and means to apply suction to said piston channel through said cylinder port.

9. In a structure of the character described, the combination of a cylinder of an internal-combustion engine, a reciprocatory piston in said cylinder having a transverse, fluid-collecting channel and an external longitudinal groove communicating with said channel, said cylinder having a port in register with said groove, said piston having an air-admission relief-port communicating with said channel remote from said longitudinal groove, means to lubricate said cylinder and piston, and means to apply suction to said port for the removal of the contents of the channel.

10. In a structure of the character described, the combination of a cylinder of an internal-combustion engine having a port through its side-wall, a reciprocatory piston in said cylinder having a transverse, fluid-collecting channel extending substantially entirely around the piston and a port connecting with said channel at a point diametrically opposite said cylinder port, means to lubricate said cylinder and piston, and means to apply different pneumatic pressures to said cylinder and piston ports.

11. In a structure of the character described, the combination of a cylinder of an internal-combustion engine having a port through its side-wall, a reciprocatory piston in said cylinder having a transverse, fluid-collecting channel extending substantially entirely around the piston and an air-admission relief-port connecting with said channel at a point diametrically opposite said cylinder-port, means to lubricate said cylinder and piston, and means to apply suction to said cylinder-port.

12. In a structure of the character described, the combination of a cylinder of an internal-combustion engine, a reciprocatory piston in said cylinder equipped with one or more piston-rings at its upper end only and having a transverse, fluid-collecting channel below said piston-ring or rings equipped with an air-admission relief-port, means to lubricate said cylinder and piston, and means to apply suction to said channel to withdraw its contents.

13. In a structure of the character described, the combination of a cylinder of an internal-combustion engine provided with a port through its side wall, a reciprocatory piston in said cylinder equipped with one or more piston-rings at its upper end only and having a transverse, fluid-collecting channel below said piston ring or rings and an air-admission relief-port connecting with said channel at a point remote from said cylinder-port, means to lubricate said cylinder and piston and means to apply suction to said cylinder-port.

14. In a structure of the character described, the combination of a cylinder of an internal-combustion engine provided with a port through its side wall, a reciprocatory piston in said cylinder equipped with one or more piston-rings at its upper end only and having a transverse, fluid-collecting channel below said piston ring or rings, said piston also having on its exterior a longitudinal groove communicating with said channel and in register with said cylinder-port and an air-admission relief-port connected with said channel at a point remote from said cylinder-port, means to lubricate said cylinder and piston, and means to apply suction to said cylinder port.

15. In a structure of the character described, the combination of a cylinder of an internal-combustion engine having a port through its side-wall, a reciprocatory piston in said cylinder having a transverse, fluid-collecting channel, a longitudinal external groove connecting with said channel and in register with said cylinder-port, a second longitudinal, external groove in alignment with said first groove and spaced therefrom, and a passage connecting said grooves, and a valve controlling said passage, means to lubricate said cylinder and piston, and means to apply suction to said cylinder-port for the removal of the contents of said channel.

16. In a structure of the character described, the combination of a cylinder of an internal-combustion engine having a port through its side-wall, a reciprocatory piston in said cylinder having a transverse, fluid-collecting channel, a longitudinal, external groove connected with said channel and in register with said cylinder-port, a second, longitudinal external groove in alignment with said first groove and spaced therefrom, a passage connecting said grooves, and a relief-port communicating with said channel remote from said cylinder-port, a valve controlling said passage, means to lubricate said cylinder and piston, and means to apply suction to said cylinder-port for the removal of the contents of the channel.

17. In a structure of the character described, the combination of a cylinder of an internal-combustion engine having a port through its side-wall, a reciprocatory piston in said cylinder having a transverse, fluid-collecting channel, a relief-port communicating with said channel at a point remote from said cylinder-port and a longitudinal external groove connecting with said transverse channel and in register with said cylinder-port, the skirt of said piston in register with said cylinder-port having a downward extension provided externally with a groove in alignment with said first groove and spaced therefrom, said piston and extension having a passage connecting said grooves, a valve controlling said passage, means to lubricate said cylinder and piston, and means to apply suction to said cylinder-port to withdraw the contents of said channel.

18. In a structure of the character described, the combination of an internal-combustion engine cylinder, a reciprocatory piston therein, means to lubricate said cylinder and piston, means to withdraw fluids from around said piston by suction, means to separate the gaseous and the lubricating oil constituents of the withdrawn fluids, means to heat the separated gaseous material by the exhaust gases of the engine, and means to employ such heated separated gaseous material to heat the fluids withdrawn from around the piston preliminary to their entrance into said separating means.

19. In a structure of the character described, the combination of a cylinder of an internal-combustion engine, a reciprocatory piston in said cylinder, means to lubricate said cylinder and piston, suction means to withdraw fluids from around said piston mixed with air, means to separate the gaseous and vapor and the lubricating constituents of the withdrawn fluids, and means to deliver the recovered lubricant to the engine intermittently without disturbing the suction action around the piston.

20. In a structure of the character described, the combination of an internal-combustion engine cylinder, a reciprocatory piston therein, means to lubricate said cylinder and piston, means to withdraw fluids mixed with air from around said piston by suction derived from the intake manifold of the engine, means to separate the gaseous and vapor and liquid lubricating constituents of the withdrawn fluids, and means to deliver the recovered lubricant to the engine intermittently without disturbing the suction action around the piston.

21. In a structure of the character described, the combination of a cylinder of an internal-combustion engine, a reciprocatory piston in said cylinder, means to supply lubricating oil to said cylinder and piston, an oil-separator, suction means to remove fluids mixed with air from around said piston and to deliver them into said separator, and means to return the separated oil intermittently to said engine without disturbing said suction removal of the fluids and their delivery into the oil-separator.

22. In a structure of the character described, the combination of an internal-combustion engine cylinder, a reciprocatory piston therein, means to supply lubricating oil to said cylinder and piston, an oil-separator, suction means to remove fluids mixed with air from around said piston and to deliver them into said separator, and means to return the separated oil intermittently under atmospheric pressure to said engine without disturbing said suction removal of the fluids and their delivery into the oil-separator.

23. In a structure of the character described, the combination of an internal-combustion engine cylinder having a port in its side-wall, a reciprocatory piston in said cylinder having a transverse, fluid-collecting channel equipped with an air-admission relief port remote from said cylinder port, means to supply lubricating oil to said cylinder and piston, an oil-separator, means to subject said cylinder-port to suction to remove the contents of said channel and by such suction to deliver the withdrawn fluids into said oil-separator, means to deliver the separated oil from said separator to said engine, and means to deliver the separated gaseous material to the fuel-intake of said engine.

24. In a structure of the character described, the combination of an internal-combustion engine cylinder having a port in its side wall, a reciprocatory piston in said cylinder having a transverse, fluid-collecting channel equipped with an air-admission relief-port remote from said cylinder port and with an external groove lengthwise said piston communicating with said channel and in register with said cylinder-port, means to supply lubricating oil to said cylinder and piston, an oil-separator, means to subject said cylinder-port to suction to remove the contents of said channel and by such suction to deliver the withdrawn fluids into said oil-separator, means to heat said withdrawn fluids by heat developed by the engine, means to deliver the separated oil from said separator to the engine, and means to deliver the separated gaseous material into the fuel-intake of the engine.

25. In a structure of the character described, the combination of an internal-combustion engine cylinder having a port in its side-wall, a reciprocatory piston in said cylinder having a transverse, fluid-collecting channel equipped with an air-admission relief-port remote from said cylinder-port and with a longitudinal external groove in register with said cylinder-port, means to supply lubricating oil to said cylinder and piston, an oil-separator, means to subject said cylinder-port constantly during the operation of the engine to suction derived from the intake-manifold of the engine to remove the contents of said channel and by such suction to deliver the withdrawn fluids into said oil-separator, means to heat said withdrawn fluids by heat developed by the engine, means to deliver the separated oil from said separator to said engine intermittently under atmospheric pressure without disturbing the continuous suction action of said cylinder-port and oil-separator, and means to deliver the separated gaseous material into the fuel-intake of said engine.

26. In a structure of the character described, the combination of an internal-combustion engine including a cylinder, a reciprocatory piston therein, and means to supply a lubricant to said cylinder and piston, means to withdraw from around said piston fluids mixed with air, means to heat said withdrawn air and other fluids to gasify and vaporize their readily volatile constituents and to separate them from the withdrawn lubricant, and means to convey said air and separated gaseous and vapor constituents to the fuel-intake of the engine.

27. In a structure of the character described, the combination of an internal-combustion engine including a cylinder, a reciprocatory piston therein, and means to supply a lubricant to said cylinder and piston, means to withdraw from around said piston fluids mixed with air, means to heat said withdrawn air and other fluids to gasify and vaporize their readily volatile constituents and to separate them from the withdrawn lubricant, and means to return such separated reclaimed lubricant to the engine.

28. In a structure of the character described, the combination of an internal-combustion engine including a cylinder, a reciprocatory piston therein, means to supply a lubricant to said cylinder and piston, means associated with the intake manifold of the engine to withdraw from around said piston fluids mixed with air, means to heat said withdrawn air and other fluids to gasify and vaporize their readily volatile constituents and to separate them from the withdrawn lubricant, means to convey said air and separated gaseous and vapor constituents to the fuel-intake of the engine, and means to return such separated reclaimed lubricant to the engine.

29. In a structure of the character described, the combination of an internal-combustion engine including a cylinder, a reciprocatory piston therein, and means to supply a lubricant to said cylinder and piston, means to withdraw from around said piston fluids mixed with air, means to subject said withdrawn air and other fluids to sub-atmospheric pressure to gasify and vaporize their readily volatile constituents, and means to separate said air and gaseous and vapor constituents from the lubricant.

30. In a structure of the character described, the combination of an internal combustion engine including a cylinder, a reciprocatory piston therein, and means to supply a lubricant to said cylinder and piston, means to withdraw from around said piston fluids mixed with air, means to subject said withdrawn air and other fluids to sub-atmospheric pressure to gasify and vaporize their readily volatile constituents, means to separate said air and gaseous and vapor constituents from the withdrawn lubricant, means to convey said air and gaseous and vapor constituents to the fuel-intake of the engine, and means to return the separated reclaimed lubricant to the engine.

31. In a structure of the character described, the combination of an internal-combustion engine including a cylinder, a reciprocatory piston therein, and means to supply a lubricant to said cylinder and piston, means to withdraw from around said piston fluids mixed with air, means to apply sub-atmospheric pressure continuously during the operation of the engine to said withdrawn air and other fluids to gasify and vaporize their readily volatile constituents, and means to separate said air and gaseous and vapor constituents from the withdrawn lubricant.

32. In a structure of the character described, the combination of an internal-combustion engine including a cylinder, a reciprocatory piston therein, and means to supply a lubricant to said cylinder and piston, means to withdraw from around said piston, fluids mixed with air, means to subject said withdrawn air and other fluids simultaneously to heat and to sub-atmospheric pressure to gasify and vaporize their readily volatile constituents, and means to separate said air, gaseous and vapor constituents from the withdrawn lubricant.

33. In a structure of the character described, the combination of an internal-combustion engine including a cylinder, a reciprocatory piston therein, and means to supply a lubricant to said cylinder and piston, means to withdraw from around said piston fluids mixed with air, means to subject said withdrawn air and other fluids simultaneously to heat and to sub-atmospheric pressure applied continuously during the operation of the engine to gasify and vaporize their readily volatile constituents, and means to separate said air, gaseous and vapor constituents from the withdrawn lubricant.

34. In a structure of the character described, the combination of an internal-combustion engine, including a cylinder, a reciprocatory piston therein, and means to supply a lubricant to said cylinder and piston, suction means associated with the intake manifold of the engine to withdraw from around said piston fluids mixed with air, means to subject said aerated withdrawn fluids to heat and sub-atmospheric pressure to gasify and vaporize their readily volatile constituents, means to separate said air, gaseous and vapor constituents from the withdrawn lubricant, and means to return the separated reclaimed lubricant to the engine intermittently under atmospheric pressure without disturbing the action of said suction means and the application of the sub-atmospheric pressure to the withdrawn fluids.

35. In a structure of the character described, the combination of an internal-combustion engine including a cylinder, a reciprocatory piston therein, and means to supply a lubricant to said cylinder and piston, means to withdraw fluids from around said piston mixed with air derived from the crank-case of the engine, means to subject said aerated fluids to sub-atmospheric pressure to gasify and vaporize their readily volatile constituents, and means to separate the air, gaseous and vapor constituents from the withdrawn lubricant.

36. In a structure of the character described, the combination of an internal-combustion engine including a cylinder, a reciprocatory piston therein, and means to supply a lubricant to said cylinder and piston, means to withdraw fluids from around said piston mixed with air derived from the crank-case of the engine, means to heat such withdrawn aerated fluids to gasify and vaporize their readily volatile constituents, and means to separate such air, gaseous and vapor constituents from the withdrawn lubricant.

37. In a structure of the character described, the combination of an internal-combustion engine including a cylinder, a reciprocatory piston therein, and means to lubricate said cylinder and piston, and means to withdraw from around said piston fluids mixed with air and to deliver the same outside of the engine.

38. In a structure of the character described, the combination of a cylinder of an internal-combustion engine, a reciprocatory piston in said cylinder having an external, transverse, fluid-collecting channel, means to admit air to said channel, means to lubricate said cylinder and piston, and means to apply suction to said channel to withdraw its contents outside of the engine.

39. In a structure of the character described, the combination of an internal-combustion engine including a cylinder, a reciprocatory piston therein, and means to lubricate said cylinder and piston, and means to withdraw outside of the engine fluids from around said piston mixed with air derived from the crank-case of the engine.

40. In a structure of the character described, the combination of an internal-combustion engine including a cylinder, a reciprocatory piston therein, and means to lubricate said cylinder and piston, and means to withdraw outside of the engine fluids from around said piston mixed with air circulated around said piston.

41. In a structure of the character described, the combination of an internal-combustion engine including a cylinder, a reciprocatory piston therein, and means to supply a lubricant to said cylinder and piston, suction means to withdraw fluids from around said piston mixed with air, means to subject said withdrawn air and other fluids simultaneously to heat and to sub-atmospheric pressure applied continuously during the operation of the engine to gasify and vaporize their readily volatile constituents, means to separate said air, gaseous and vapor constituents from the withdrawn lubricant, means to convey such separated air, gaseous and vapor constituents to the fuel-intake of the engine, and means to return the separate reclaimed lubricant to the engine intermittently under atmospheric pressure without disturbing the action of said suction means and the application of the sub-atmospheric pressure to the withdrawn fluids.

42. In a structure of the character described, the combination of a cylinder of an internal-combustion engine, a reciprocatory piston in said cylinder having an external, transverse, fluid-collecting channel and an air-inlet for said channel, said cylinder having a port through its side wall outwardly beyond the skirt of the piston when the latter is in its innermost position, said piston-skirt having an extension cooperating with said cylinder port when it would otherwise be uncovered by the piston skirt, and means to apply suction to said cylinder port to withdraw the contents of said piston channel therethrough.

43. In a structure of the character described, the combination of a cylinder of an internal-combustion engine, a reciprocatory piston in said cylinder having an external, transverse, fluid-collecting channel and an air-inlet for said channel, said cylinder having a port through its side wall outwardly beyond the skirt of the piston when the latter is in its innermost position, means to control said cylinder port when the skirt of the piston does not cover it, and means to apply suction to said cylinder port to withdraw the contents of said piston channel therethrough.

44. In a structure of the character described, the combination of a cylinder of an internal-combustion engine, a reciprocatory piston in said cylinder having an external, transverse, fluid-collecting channel, an external, longitudinal groove communicating with said channel and an air-inlet port extended through the wall of the piston and communicating with said channel, said cylinder having a port through its side wall outwardly beyond the skirt of the piston when the latter is in its innermost position, said piston skirt having an extension in register with said longitudinal groove and cooperating with said cylinder port when the latter would otherwise be uncovered by the piston skirt, and means to apply suction to said cylinder port to withdraw the contents of said piston channel therethrough.

45. In a structure of the character described, the combination of an internal-combustion engine cylinder, a reciprocatory piston therein, a fuel-supplying system for the engine, a lubricating system for said cylinder and piston, a separator comprising a tank having an upper separating chamber and a lower storage compartment connected together by an air-port and an oil-port, means to deliver impure lubricant from said lubricating system into said chamber and the gases in said chamber into the fuel-supplying system of the engine by suction derived from the engine intake-manifold, a float in said lower storage compartment, a valve controlling said air-port and opened positively by said float, and a valve controlling said oil-port closed by said float, and opened automatically independently of said float when the latter is in its position corresponding to the open position of said air-valve.

RALPH L. SKINNER.